US005800680A

United States Patent [19]

Guerra

[11] Patent Number: 5,800,680
[45] Date of Patent: Sep. 1, 1998

[54] SYSTEM AND METHOD FOR RAPID OPENING OF COKING VESSELS

[75] Inventor: Eduardo Cardoso De Melo Guerra, Rio de Janeiro, Brazil

[73] Assignee: Petroleo Brasileiro S.A. - Petrobras, Rio de Janeiro, Brazil

[21] Appl. No.: 709,032

[22] Filed: Sep. 6, 1996

[51] Int. Cl.$^6$ .................................................. C01B 47/00
[52] U.S. Cl. .................................................. 201/35
[58] Field of Search ......................................... 201/35

[56] References Cited

U.S. PATENT DOCUMENTS 4,498,695  2/1985  Pardo ............................... 292/260

*Primary Examiner*—Edward J. Cain
*Attorney, Agent, or Firm*—Sughrue, Mion, Zinn, Macpeak & Seas, PLLC

[57] ABSTRACT

The present invention relates to a system for fastening and sealing the flanges of the inlets of pressure vessels operating under extreme temperature conditions and with frequent opening/closing cycles, as is the case of coking vessels (5), consisting of an assembly of a flange of the tongue (1) and groove (2) type, a C-clamp (3), and a soft compression gasket (4). Such a system offers total remote control of the opening of the vessel inlets, resulting in greater safety, less unit downtime, and lower operating costs. The invention also relates to a method for opening inlets which results therefrom.

6 Claims, 11 Drawing Sheets

SYSTEM AND METHOD FOR RAPID OPENING OF COKING VESSELS

FIELD OF THE INVENTION

The present invention relates to an improved system and method for facilitating the opening/closing of the inlets of pressure vessels under extreme temperature conditions.

More specifically, the present invention relates to the form of fastening the flanges of the inlets of coking vessels, which makes the operation of opening and closing them more rapid and safer and also assists in the procedures for decoking these vessels.

DESCRIPTION OF THE PRIOR ART

Coking vessels operate on a cyclical basis, on batches, with a residual vacuum firstly being applied at approximately 500° C., via the bottom. Inside the vessel, the residual vacuum completes the coking reaction, previously initiated in a heating furnace, with a conversion into oil coke, a black, porous material with the characteristics of rock.

After a stage of purging with steam to remove light fractions from the porous medium, water is injected via the bottom of the coking vessel to cool the coke. In this stage, the temperature of the coke is reduced from close on 450° C. to approximately 100° C.

Once the coke has been cooled and the water drained off, the inlets at the top and bottom of the vessel are opened to allow the entry of a borer, via the top, to break up the coke with a high-pressure jet of water.

The broken-up coke falls out via the inlet in the bottom of the coking vessel, passing through a decoking skirt, and is removed to a storage area.

After the coke has been removed, the inlets are closed and a new charging cycle is initiated.

In this way, the inlets in the bottom and top are opened and closed during every operating cycle. The frequency of this activity depends on the cycle duration of each vessel, this cycle typically taking place at least once a day.

There are hundreds of coking vessels in operation throughout the world and the trend is to increase the number of units as a function of the greater supply of heavy oils.

Over 95% of existing coking vessels use the traditional procedure, via manual operation, to "break up" and remove the coke, as described below:

1)—Upper inlet:
 a) Disconnect the flanges;
 b) Raise the cover of the inlet with an ordinary manual hoist;
 c) Fasten the guide piece of the decoking rod;
 d) Install the coke-cutting tool;
 e) After decoking, remove the above-mentioned guide piece;
 f) Reposition the cover and reconnect the flanges.

2)—Lower inlet:
 a) Displace the flange-carrying carriage to below the inlet;
 b) Disconnect the flanges and remove the inlet cover from the inlet on to the flange-carrying carriage;
 c) Displace the flange-carrying carriage;
 d) Raise the decoking skirt;
 e) Fasten the decoking skirt to the inlet by means of screws;
 f) Release the skirt after decoking;
 g) Reposition the flange-carrying carriage below the inlet and raise the inlet cover to the inlet;
 h) Reconnect the flanges.

Because the coking vessels operate under reasonably high temperature conditions, this procedure involves personal risk to the operators and is therefore not recommended.

In an attempt to rectify this drawback, a number of methods and procedures have already been proposed with a view, basically, to "automating" the decoking operation, i.e. moving the operator away from the inlet when it is opened.

The prior art offers a number of alternatives along these lines:

U.S. Pat. No. 5,098,524 and WO-A-91/06800 describe hydraulic devices which, by means of remote control, tilt the cover of the lower inlet after removal of the flange screws.

U.S. Pat. No. 4,960,358 describes a similar device in which, after removal of the flange screws, the bottom cover slides laterally on rails and the decoking skirt is raised automatically.

U.S. Pat. No. 5,092,963 describes a way of removing the cover from the upper inlet of a coking vessel by means of hydraulic devices actuated after removal of the flange screws.

However, it can be seen that all the above-mentioned devices or methods are, in fact, "semi-automatic" as regards the permanence of the screws, with manual removal of the fastening flanges of the inlets as only the displacement of the covers from these inlets is automated.

In addition to being a long process in that it involves the removal of dozens of screws, the process of opening/closing the inlets therefore still presents a personal risk to the operators because the residual water in the porous medium is at a temperature close to 100° C. and drains, in liquid form, via the lower flange and, in vapour form, via the upper flange during the process of removing the screws.

An obvious solution to the problem would be to use the devices conventionally used in the rapid opening and closing of flanges, namely clamps with special wedge-shaped flanges which are used on high-pressure equipment such as, for example, compression vessels for divers.

However, such devices have been completely disregarded in terms of the process of fastening the flanges of coking-vessel inlets, on account of the specific conditions found there: namely high temperatures associated with the need for frequent opening and closing of the inlets.

As is known, for operation at high temperatures the use of flanges requires the provision of a metal gasket specified for sealing in high-temperature environments. Such a procedure would bring about the introduction of considerable stresses in the surfaces between the clamp and the flange. In a cyclical process with frequent opening and closing of the inlets, as is the case in the operation of coking vessels, it is easy to understand that there would be excessive wear if a very rigid gasket were used, requiring constant repair of the equipment. The use of a clamp for the application in question is therefore not feasible; publications in the field expressly advise against it, as may for example be seen in the text of U.S. Pat. No. 5,228,825 (column 1, lines 43 to 56).

As an alternative to this technical limitation, U.S. Pat. No. 5,048,876 proposes a mechanism for fastening the flanges by means of a clamp with a rolling surface instead of the customary sliding surface. However, such a design would be costly and unreliable, given the difficulties in designing rolling surfaces operating under high-pressure conditions and in an environment containing particulates.

So, although they have made a great contribution to minimizing the problem of the safety and continuity of the operation of decoking coking vessels, known devices or techniques have therefore not managed to provide a complete solution to that problem.

A totally automatic system is now proposed for the remote opening and closing of the inlets of coking vessels, which makes it possible to process more charges in the units on account of the gain in operating time and the complete safety provided for operating staff. The invention provides a new and innovative design for such systems, and also a method relating to the use of this system.

OBJECTS OF THE INVENTION

An object of the present invention is to provide a system which makes it possible to open and close the flanges of coking-vessel inlets in a very short time, operating safely and remotely.

A further object of the present invention is to provide a system for fastening the inlets of pressure vessels, which includes a fastening clamp (C-clamp) which is adapted to effect frequent opening and closing of the inlets under extreme temperature and pressure conditions, as is the case with coking vessels.

A further object of the present invention is to provide a system for fastening the inlets of pressure vessels, consisting in a C-clamp/soft gasket/tongue-and-groove-type flange assembly which promotes sealing by crushing, without introducing high stresses which are likely to give rise to accentuated wear on the faces of the flange and of the clamp, thereby making viable the use of clamps for frequent use and at high temperatures.

A further object of the present invention is to provide a method which enables the system of the present invention to operate.

SUMMARY OF THE INVENTION

The present invention is associated with a system for the frequent opening and closing of the inlets of pressure vessels and is more particularly suited to, but not limited to, use in coking vessels.

A first aspect of the present invention provides a system for rapid opening of pressure vessels under extreme temperature conditions, characterized in that said system comprises an assembly for connection of flanges by means of a clamp which has been improved for frequent use, comprising a tongue-type flange and a groove-type flange, a C-clamp-type fastening clamp and a non-metallic compression gasket designed to be placed at the interface of the flanges so as to promote sealing of the system.

A second aspect of the present invention provides a method for rapid opening of pressure vessels under extreme temperature conditions and with frequent use, characterized in that it comprises releasing, by remote control, the C-clamp-type fastening clamp which connects the flanges of the inlets of the pressure vessel, thereby changing the vessel from the closed state to the open state; and disconnecting the external flanges and detaching them from the pressure vessel.

BRIEF DESCRIPTION OF THE DRAWINGS

In order that those skilled in the art may take better advantage of the present invention, the appended drawings are provided, in which.

The Figures which accompany this specification only illustrate and facilitate comprehension of the invention and do not limit it in any way. However, any adaptation or modification of the design of the system which will be described will be included within the scope of the present invention.

DESCRIPTION OF THE INVENTION

Figure 1:
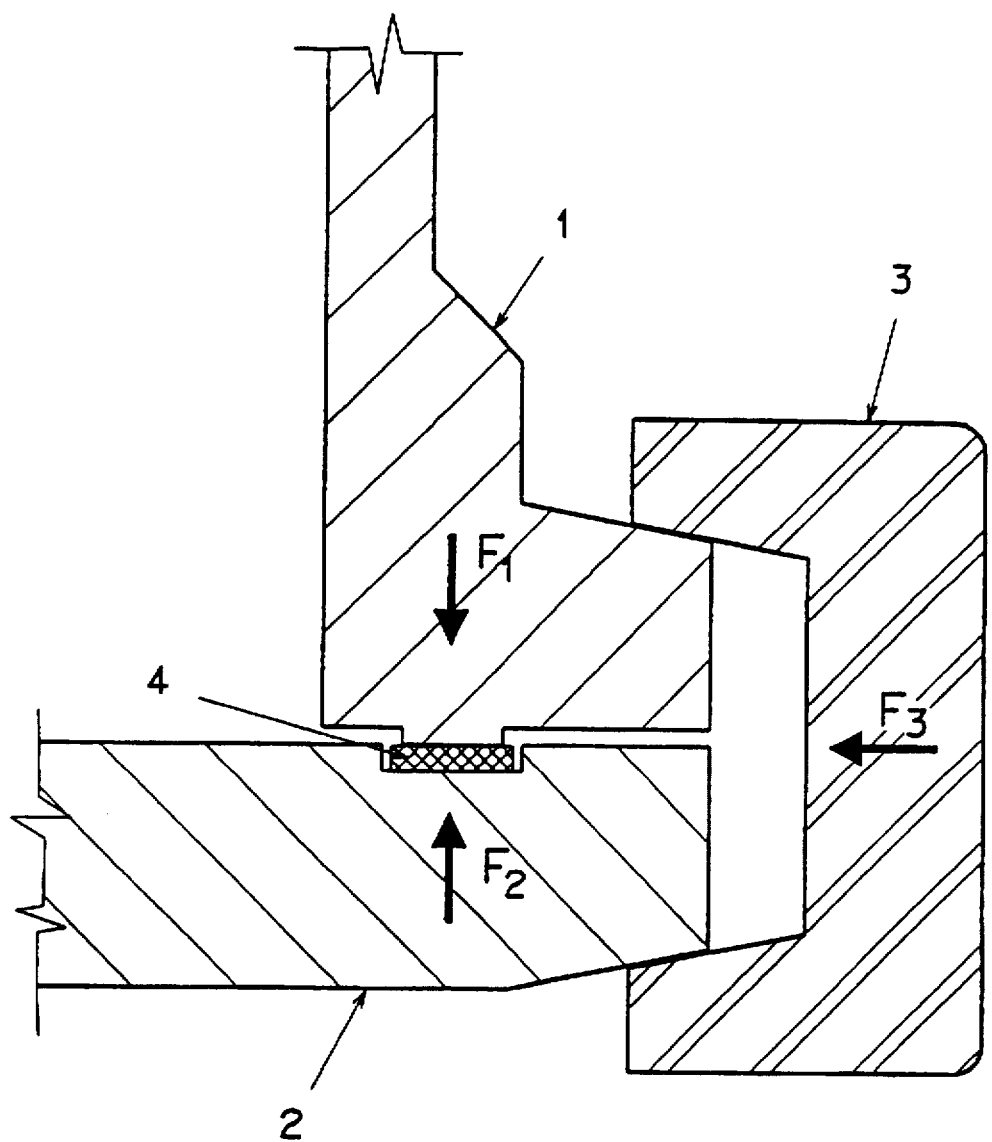
FIG. 1 shows a diagrammatic view of the system of the present invention comprising the fastening device, the flanges and the gasket.

FIG. 1 shows a diagrammatic detail which constitutes the system of the present invention, showing the flanges of tongue (1) and groove (2) type, these being interconnected by means of the fastening clamp (3) with the seal promoted by the compression gasket (4).

It also shows an illustrative diagram of the forces which result from the stresses involved in operating the system of the present invention, namely: the compression forces F1 and F2 responsible for sealing the system; and the closing force F3 which is responsible for fastening the system.

The most important aspect of the present system is found in the sealing procedure which makes use of a soft compression gasket (hydraulic cardboard or compressed asbestos, for example) for the process of connecting the flanges by means of the clamp under extreme temperature conditions.

As is known, C-clamps are normally used when there is a need for a metal/metal seal in conjunction with elastomer O-rings. There is no material available of sufficient strength to make the O-ring for operation under high-temperature conditions (close to 500° C. in the case of coking vessels). In these instances, the use of clamps requires flanges with a metallic compression gasket, such as double-casing or spiral-type metallic gaskets with an asbestos or graphite insert. However, metallic gaskets introduce very great stresses into is the flange/flange relationship, in order to permit sealing. As a consequence, high stresses arise in the clamp/fastening-flange relationship. In the processes of cyclic opening and closing, there is excessive wear on account of these high stresses, which is a consequence of the use of a very rigid compression gasket.

If the minimum crushing pressures within a ⅛"-thick hydraulic cardboard gasket (1600 psi) are compared with more conventional metallic gaskets, namely: corrugated carbon-steel double casing with asbestos filler (4500 psi) or corrugated stainless-steel double casing with asbestos filler (6500 psi), it may be seen that the former requires a sealing force which is 3 to 4 times less than conventional gaskets. As a result, this lower force gives rise to a friction force which is also 3 to 4 times less between the flange/clamp metallic surfaces with the consequent reduction in wear during cyclic operation. In this case, the present system goes against the practice adopted in the prior art where, given its requirement to operate at high temperatures, it was mandatory for the seals of the coking vessel flanges to be metallic gaskets and therefore their connections had to be fastened by means of screws, completely ruling out the alternative of using a clamp (on the grounds that it was not technically feasible for such specifications).

A further advantageous aspect offered by the system of the present invention is the use of tongue-and-groove-type flanges, which are more efficient in terms of sealing and which, because they fix the position of the gasket, guarantee a perfect distribution of stresses over the flange and the clamp.

The present invention also offers the unexpected possibility of using universal hydraulic cardboard compression gaskets, which offers a limit service temperature of 540° C., much closer to the working conditions of coking vessels (500° C.), which always meant that such gaskets were ruled out for this type of use.

Figure 2:
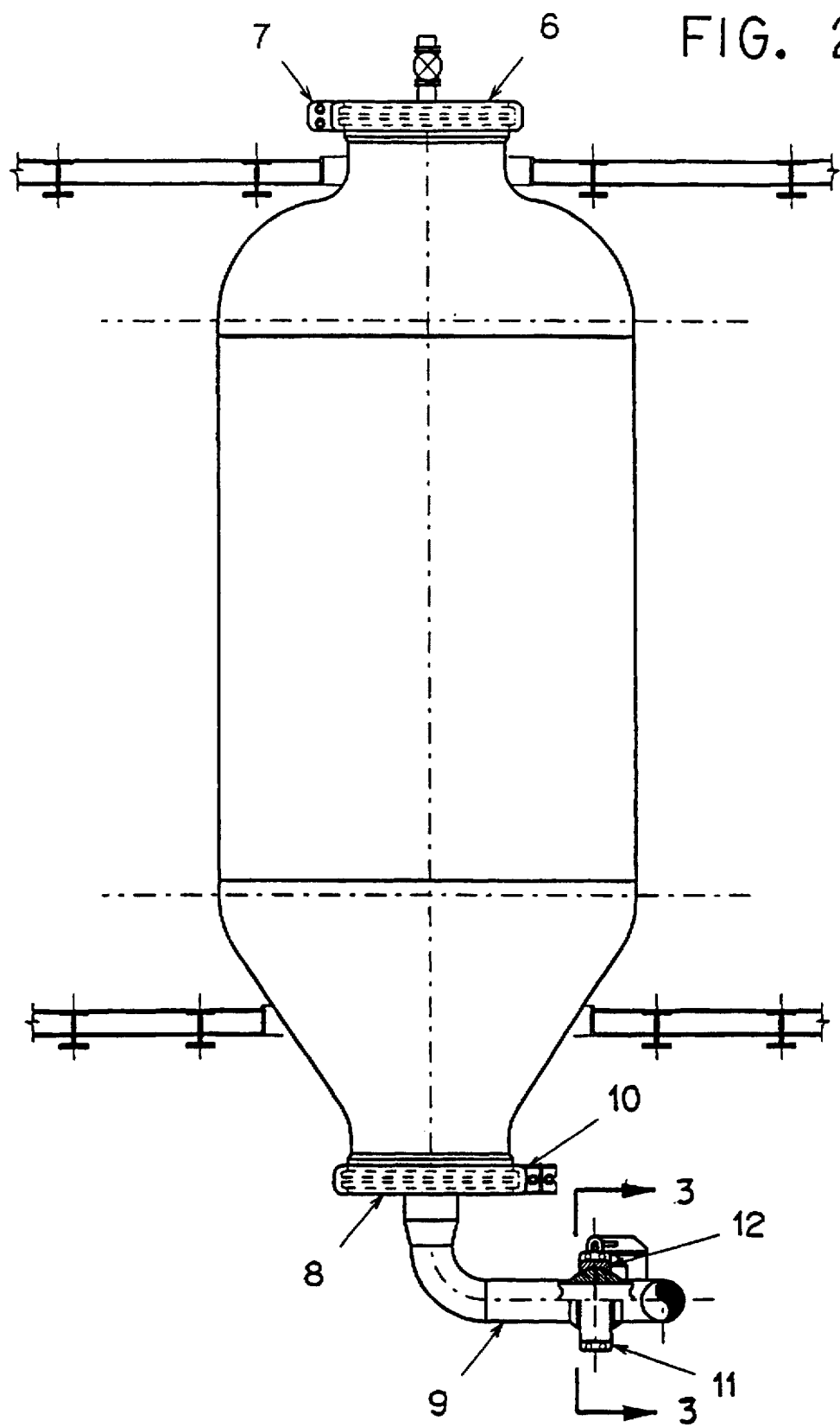
FIG. 2 shows a general view of a coking vessel using the system of the present invention on the upper and lower inlets and on the charging-line connection flanges.
Figure 3:
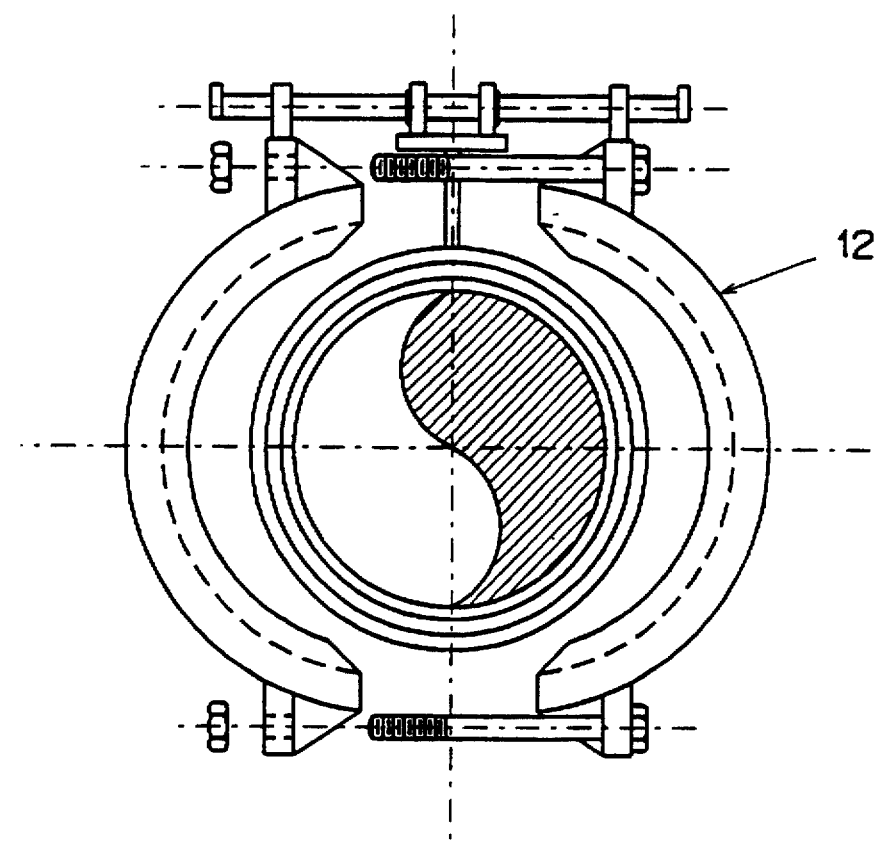
FIG. 3 shows a view in transverse section, taken along the line 3—3 in FIG. 2, the device for fastening the flanges being shown in the open position.
Figure 4:
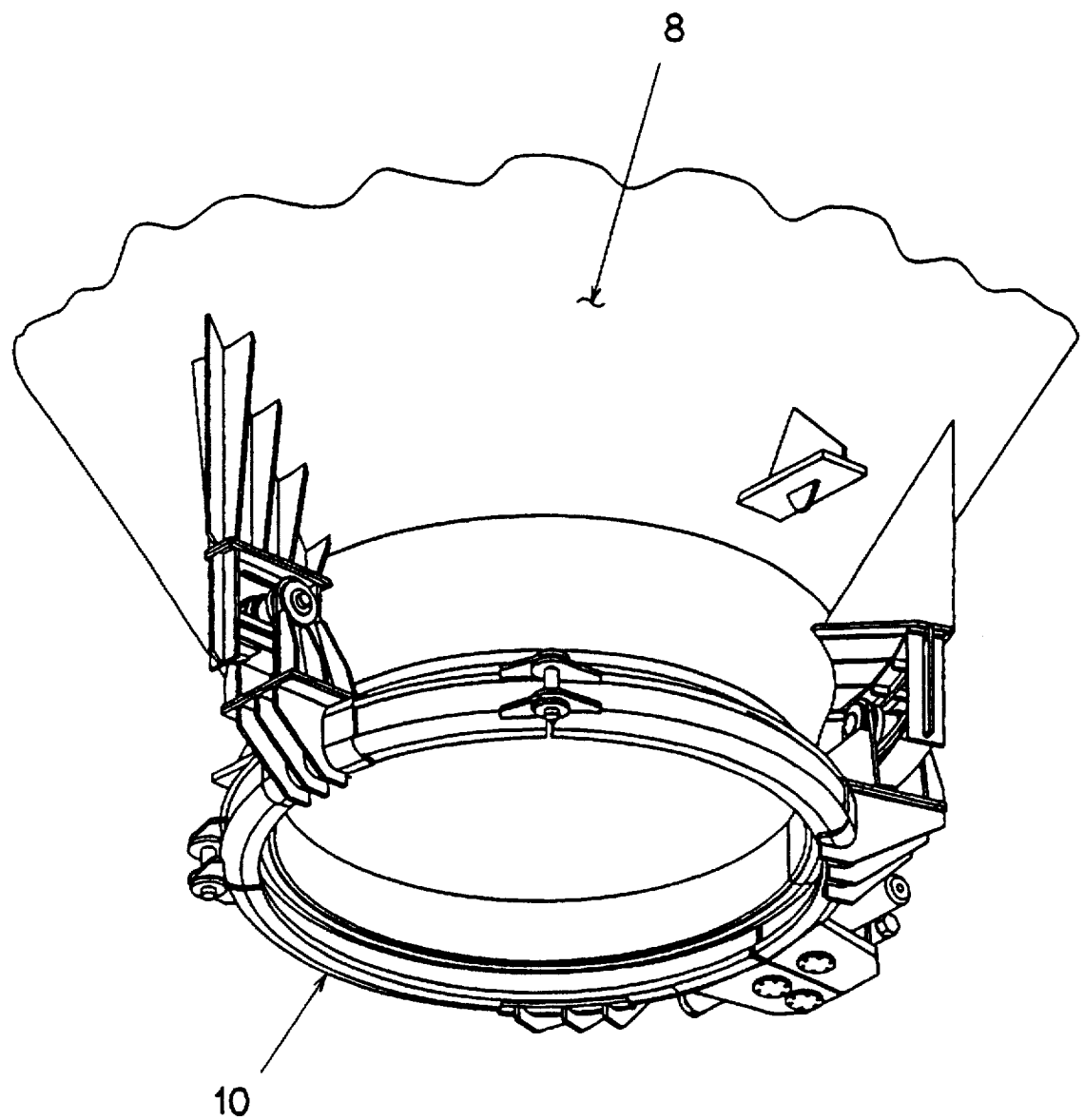
FIG. 4 shows an underneath perspective view of the lower inlet of the coking vessel, with the device for fastening the flanges shown in the closed position, and without the bottom flange.
Figure 5:
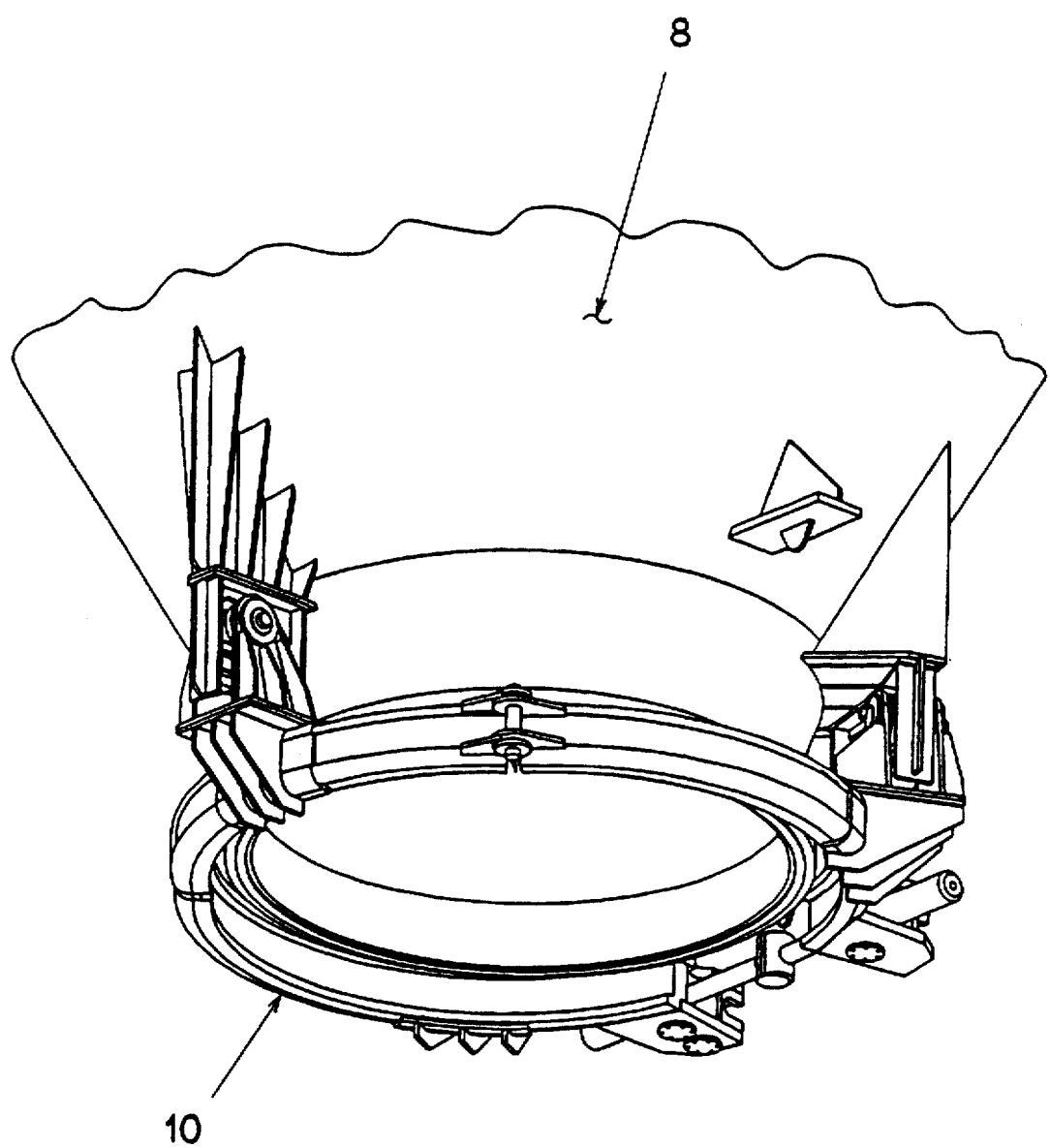
FIG. 5 shows an underneath perspective view of the lower inlet of the coking vessel, with the device for fastening the flanges shown in the open position.
Figure 6:
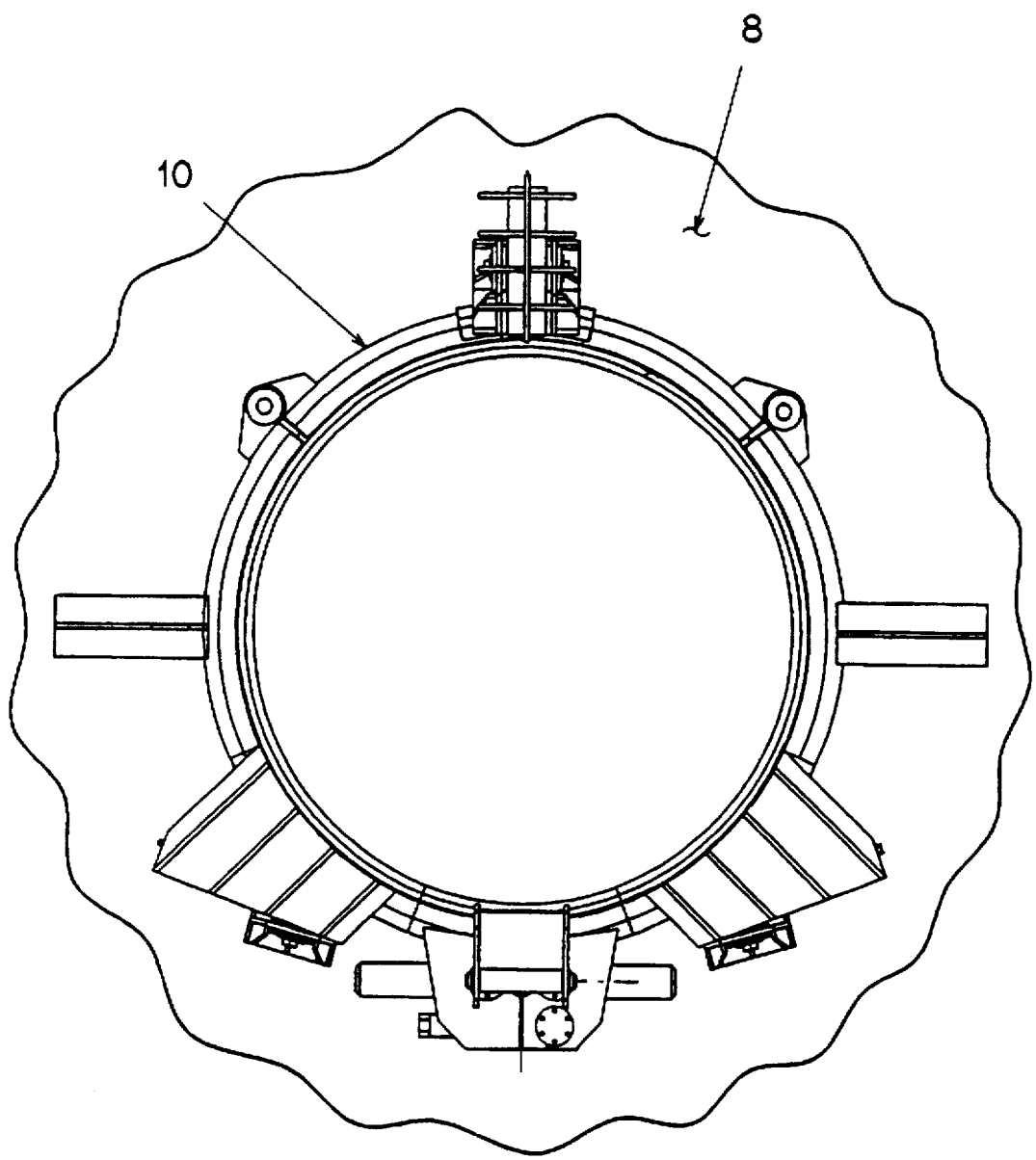
FIG. 6 shows a front view of the lower inlet of the coking vessel, with the device for fastening the flanges shown in the closed position, and without the bottom flange.
Figure 7:
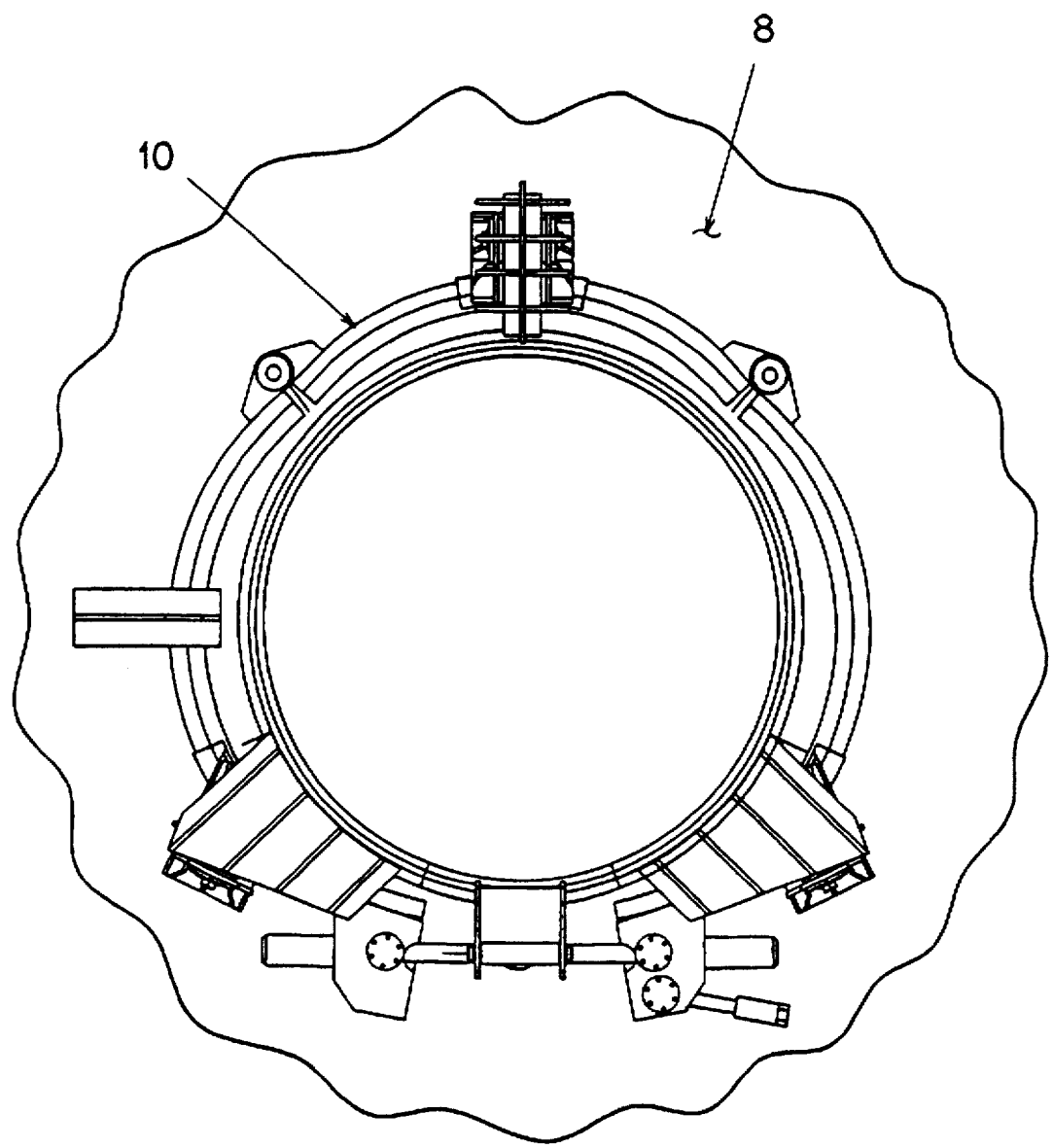
FIG. 7 shows a front view of the lower inlet of the coking vessel, with the device for fastening the flanges shown in the open position.

FIG. 2 shows a coking vessel (5) of a generally cylindrical format where the system of the present invention can be seen to have been installed a number of times: a) for connection or closure of the upper inlet (6) by means of the fastening clamp (7); b) for connection of the lower inlet (8) to the charging line, by means of the fastening clamp (10); and (c) for the interconnection of the charging line by means of the fastening clamp (12).

FIGS. 3 to 9 illustrate the method established for the use of the system of the present invention, briefly, conventional C-clamps on flanges with a sealing device which has been improved for the proposed purpose.

By the method of the present invention, opening of the inlets of pressure vessels operating under extreme temperature conditions, as is the case of coking vessels, may be achieved more rapidly and more safely than when using conventional practices.

Figure 8:
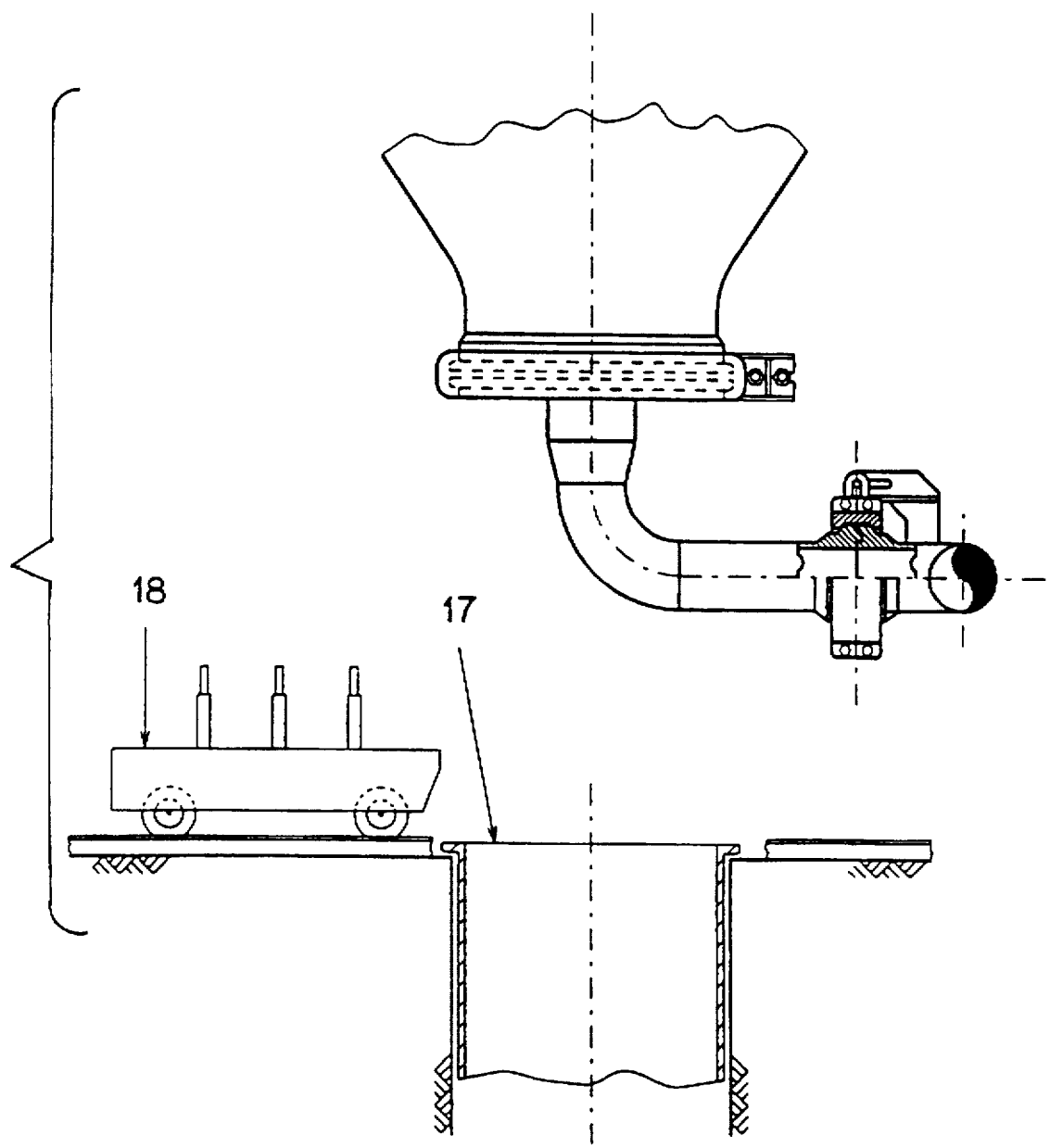
FIG. 8 is a general side elevational view of the upper inlet of the coking vessel, showing the system for fastening the flanges and a device for moving the top flange.
Figure 9:
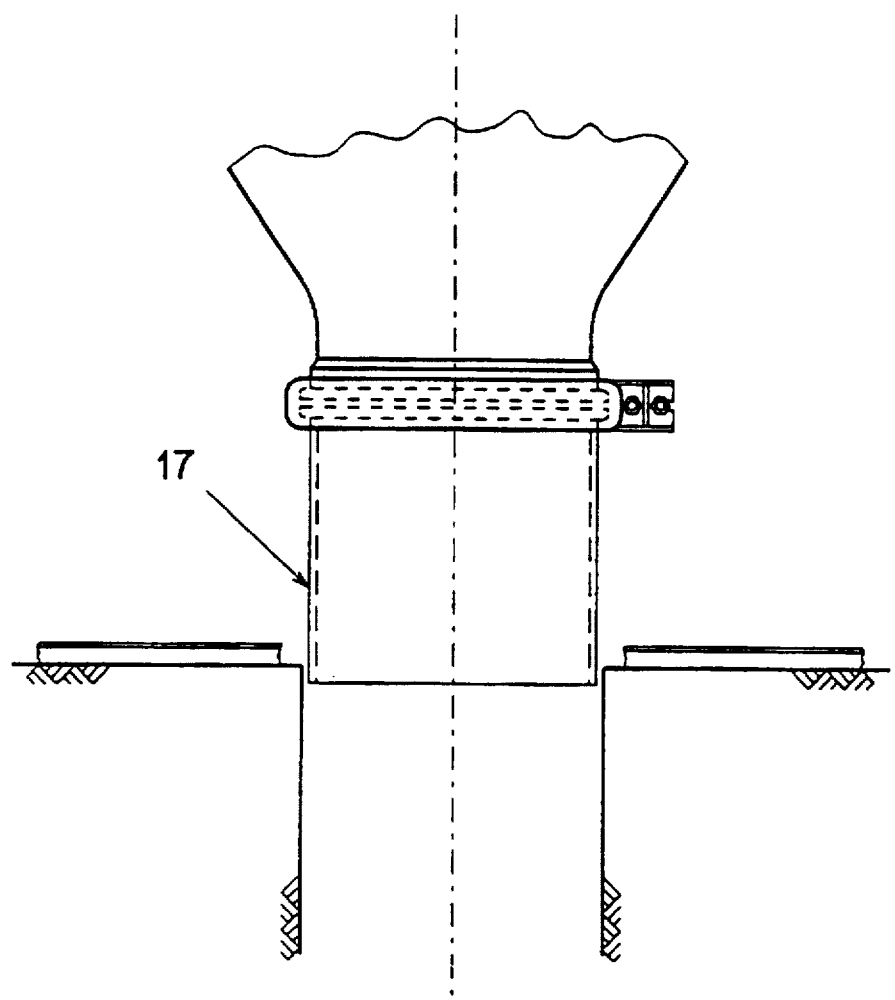
FIG. 9 is a general view of the upper inlet of the coking vessel, with a detail of the installation of the guide piece of the coke cutting tool after removal of the top flange.

In the case of the upper inlet of a coking vessel, illustrated in FIGS. 2, 8 and 9, the method is based on the fastening and closing of the flanges (13, 14) by means of a hydraulically actuated C-clamp (7), so that its release and consequent opening may be achieved remotely, thereby releasing the top flange (13). Once released, the top flange (13) is raised and displaced away from the inlet by means of a mechanical device (hydraulic winch) (15), also actuated hydraulically. After the removal of the top flange (13), the same winch (15) installs the guide piece (16) of the tool for cutting the coke in a rapid and safe manner by making use of the clamp (7) which is already installed in the inlet, thereby commencing decoking procedures.

Figure 10:
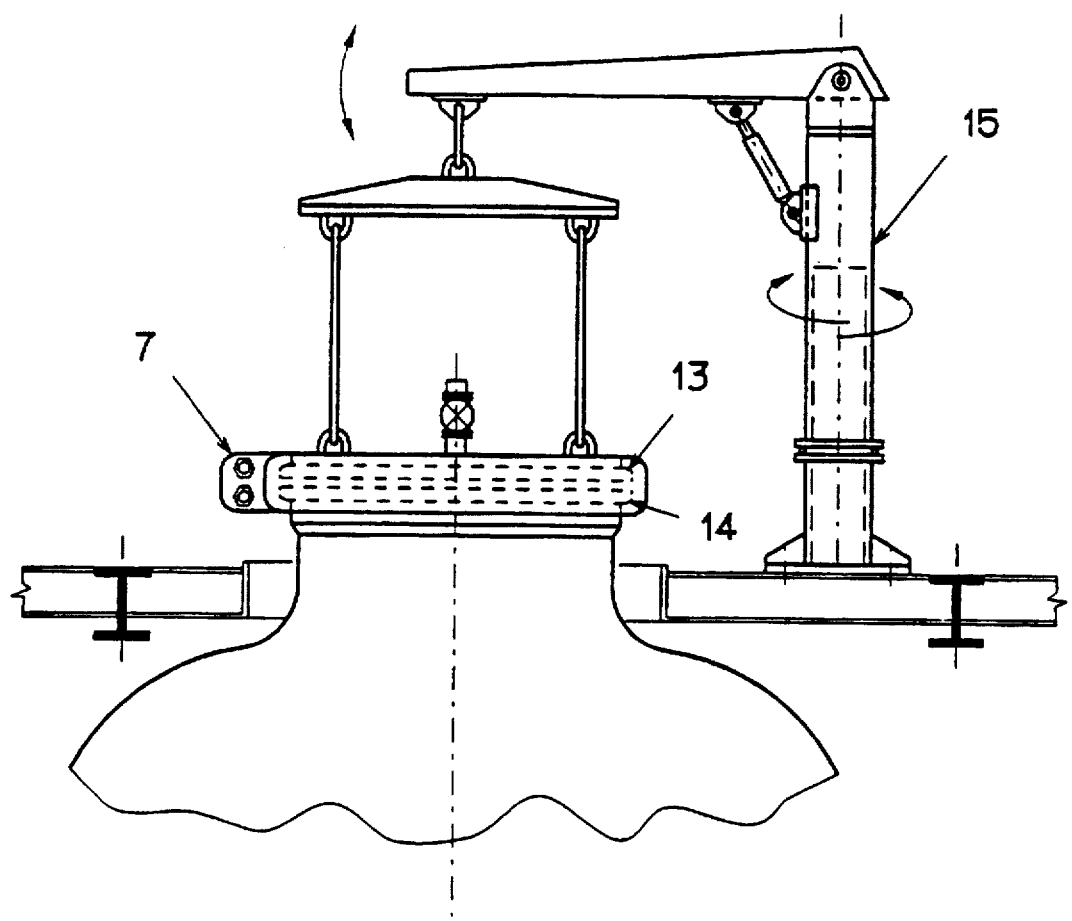
FIGS. 10 and 11 are diagrammatic views showing the use of the system for fastening the decoking skirt.
Figure 11:
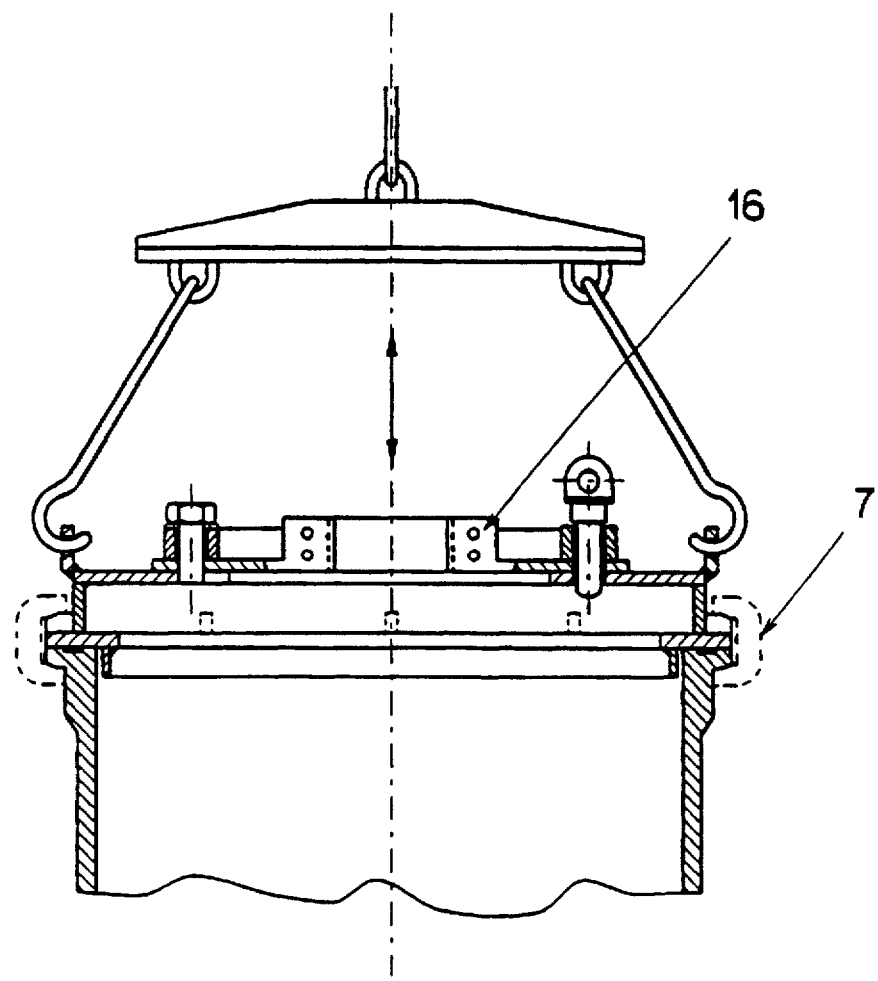

In the case of the lower inlet and the connection of the charging line, illustrated in FIGS. 2 to 7 and 10, the method also consists in the fastening and closing of the flanges by means of hydraulically actuated C-clamps (10, 12) and by screws, respectively, it being possible for both to be actuated hydraulically. Release is effected remotely in the case of opening the C-clamp (10), and manually in the case of opening the C-clamp (12) (but may also be remote in the case of the latter). The open C-clamps (10, 12) release the bottom flange and the flange for interconnection of the charging line, uncoupling a segment (9) of the charging line which is deposited and collected by a conventional flange-carrying carriage (18) which is able to clear the lower inlet (8). The decoking skirt (17) is then raised and fastened to the bottom inlet (8) by means of the C-clamp (10). FIGS. 10 and 11 show the manner in which the decoking skirt (17) is fastened to the lower inlet (8). The method of the present invention therefore provides an operation for opening/closing pressure vessels at high temperatures which can be carried out rapidly, safely and inexpensively.

Further advantageous aspects may easily be inferred from the description of the present invention:

a) It reduces the operating cost in that it dispenses with frequent changes of metallic gaskets which are much more expensive than cardboard gaskets;

b) It provides a more homogeneous distribution of stresses over the flanges and over the gasket, ensuring better sealing during operation;

c) It permits safe reopening of the gasket, during operation, if there is any leakage;

d) In the case of production of coke of the "shot" type, it eliminates the risk of personal accident as it enables operators to control the operation of opening the lower flange from a remote position;

e) It also operates advantageously in the case of C-clamps which make use of screws and which are actuated manually on account of the practical nature of the initial opening of the seal with the use of a small number of screws;

f) The flange-carrying carriages of existing units can still be used without any adaptation being necessary.

I claim:

1. A system for rapid opening of coking vessels under extreme temperature conditions, comprising an assembly for connection of flanges by means of a clamp which has been improved for frequent use, comprising a tongue-type flange (1) and a groove-type flange (2), a C-clamp-type fastening clamp (3) and a non-metallic compression gasket (4) designed to be placed at the interface of the flanges so as to promote sealing of the system.

2. A system according to claim 1, wherein the non-metallic compression gasket (4) is made from hydraulic cardboard.

3. A system according to claim 1, wherein the non-metallic compression gasket (4) is made from compressed asbestos.

4. A method for rapid opening of coking vessels under extreme temperature conditions and with frequent use, comprising releasing, by remote control, the C-clamp-type fastening clamp which connects the flanges of the inlets of the pressure vessel, thereby changing the vessel from the closed state to the open state; and then disconnecting the external flanges and detaching them from the pressure vessel.

5. A method according to claim 4, wherein the external flanges include a top flange (13) of the vessel (5), which is removed by a displacement device (15) operated by remote control.

6. A method according to claim 4, wherein the external flanges include a bottom flange of the vessel (5) and a flange for interconnection of the charging line; and in that external flanges are removed, together with a segment (9) of the charging line, by means of a flange-carrying carriage (18) positioned below the flange/line-segment circuit.

* * * * *